United States Patent
Kim et al.

(10) Patent No.: US 7,042,896 B1
(45) Date of Patent: May 9, 2006

(54) METHOD FOR MANAGING A DIGITAL INTERFACE CONNECTION

(75) Inventors: Do-hyoung Kim, Kyungki-do (KR); Goan-soo Seong, Seoul (KR)

(73) Assignee: Samsung Electronics Co. Ltd., Kyungki-do (KR)

( * ) Notice: Subject to any disclaimer, the term of this patent is extended or adjusted under 35 U.S.C. 154(b) by 1009 days.

(21) Appl. No.: 09/626,080

(22) Filed: Jul. 26, 2000

(30) Foreign Application Priority Data

Jul. 26, 1999 (KR) .................................. 99-30339

(51) Int. Cl.
*H04L 12/43* (2006.01)
(52) U.S. Cl. .................................... 370/461
(58) Field of Classification Search ................ 370/401, 370/461, 402
See application file for complete search history.

(56) References Cited

U.S. PATENT DOCUMENTS

| | | | |
|---|---|---|---|
| 5,452,349 A * | 9/1995 | Uehara et al. ............. | 379/211 |
| 5,793,978 A | 8/1998 | Fowler | |
| 5,918,019 A | 6/1999 | Valencia | |
| 6,018,770 A * | 1/2000 | Little ......................... | 709/223 |
| 6,134,662 A * | 10/2000 | Levy et al. ................. | 713/200 |
| 6,205,145 B1 | 3/2001 | Yamazaki ................... | 370/395 |
| 6,226,287 B1 * | 5/2001 | Brady ......................... | 370/352 |
| 6,320,874 B1 * | 11/2001 | Crump et al. ................ | 370/466 |
| 6,377,549 B1 * | 4/2002 | Ngo et al. ................... | 370/233 |
| 6,389,496 B1 * | 5/2002 | Matsuda ...................... | 710/316 |
| 6,445,711 B1 * | 9/2002 | Scheel et al. ................ | 370/402 |
| 6,564,266 B1 * | 5/2003 | Goto et al. .................. | 709/250 |
| 6,631,426 B1 * | 10/2003 | Staats ........................... | 710/9 |
| 6,675,243 B1 * | 1/2004 | Bastiani et al. ............. | 710/105 |
| 6,751,221 B1 * | 6/2004 | Saito et al. .................. | 370/392 |
| 6,754,226 B1 * | 6/2004 | Nakano ....................... | 370/466 |
| 6,763,391 B1 * | 7/2004 | Ludtke ........................ | 709/231 |
| 6,788,653 B1 * | 9/2004 | Sakamoto et al. .......... | 370/282 |
| 2003/0172201 A1* | 9/2003 | Hatae et al. .................... | 710/8 |

FOREIGN PATENT DOCUMENTS

JP          7-162968          6/1995

OTHER PUBLICATIONS

Article "A formal description of the DTE packet level in the X.25 recommendation"; Authors- S. Alfonzetti, S. Casale, A. Faro; published 1979.

(Continued)

*Primary Examiner*—Huy D. Vu
*Assistant Examiner*—Daniel Ryman
(74) *Attorney, Agent, or Firm*—Sughrue Mion, PLLC

(57) ABSTRACT

A method for managing a digital interface connection is provided. The method for managing the connection of plurality of devices which are point-to-point connected by a digital interface includes: where an arbitrary first device has to break a point-to-point connection between the first device and another device which is point-to-point connected to the first device, the first device sending a second device, which established the point-to-point connection, a connection release request command requesting the second device to break the connection and the second device receiving the connection release request command to analyze the connection release request command, and the second device breaking the point-to-point connection in response to the connection release request command. When a plurality of devices are point-to-point connected, the method enables the concerned device of the connection to break the connection, thus allowing for enhanced connection management efficiency.

11 Claims, 3 Drawing Sheets

OTHER PUBLICATIONS

Alfonzetti S et al: "A Formal Description of the DTE Packet Level in the X.25 Recommendation", Alta Frequenza, Ufficio Centrale AEI-CEI. Milano, IT, vol. 48, No. 4, Aug. 1979, pp. 513-522, XP000813194.

Printer Working Group C (PWG-C) et al: "PWG-C proposal to the 1394 Trade Association AV WG: AV/C Managed Asynchronous Serial Bus Connections" 1394 Trade Association, Jul. 7, 1998, XP002215801.

* cited by examiner

METHOD FOR MANAGING A DIGITAL INTERFACE CONNECTION

BACKGROUND OF THE INVENTION

1. Field of the Invention

The present invention relates to a method for managing the connection of digital devices connected to a digital interface through the digital interface, and more particularly, to a method for managing a digital interface connection which, when a point-to-point connection is established among digital devices connected through a digital interface, such as an IEEE 1394, enables the concerned device of the point-to-point connection to release this connection.

2. Description of the Related Art

A plurality of digital devices can be interconnected through a digital interface which conforms to an interface standard such as the IEEE 1394 standard. A connection managing method between those digital devices is described in the International Electrotechnical Commission (IEC) 61883 standard. According to the IEC 61883 standard, input and output plugs are defined for each digital device as the entry of an incoming bit stream and the exit of an outgoing bit stream, respectively. Further, the input and output plugs are controlled by managing registers such as an output master plug register (oMPR), an output plug control register (oPCR), an input master plug register (iMPR), and an input plug control register (iPCR), so that a connection between digital devices can be managed.

A point-to-point connection, which is a connection made between such digital devices, consists of an output plug, an input plug, and a channel therebetween. The connection is defined such that an arbitrary device can establish or overlay the connection and that only a device which establishes the connection can break the connection. Establishment or release of the point-to-point connection is performed by managing registers such as oMPR, oPCR, iMPR, and iPCR.

FIG. 1 is a diagram for explaining a conventional method for managing connections.

FIG. 2 shows the connection related fields of oPCR and iPCR used in the IEC 61883 standard. Referring to FIG. 1, a point-to-point connection is established among a DVCR 10, a first DTV 12, and a second DTV 14 by an IEEE 1394 interface. Referring to FIG. 2, in devices utilizing the conventional method for managing connections, an output plug control register oPCR shown in (a) and an input plug control register iPCR shown in (b) include the connection related fields P-2-Pcnt and nCh, respectively. For example, if devices having the plug control registers are point-to-point connected, the content of oPCR of DVCR 10 is oPCR.P-2-P_Connection_Counter(P-2-Pcnt)=1, oPCR. Channel_Number (nCh)=33. The content of iPCR of first DTV 12 is iPCR.P-2-P_Connection_Counter(P-2-Pcnt)=1, iPCR. Channel_Number(nCh)=33. Furthermore, if the operation of iPCR and oPCR is performed successfully, a point-to-point connection of DVCR 10 and first DTV 12 is established. The IEEE 1394 modules of DVCR 10 and first DTV 12 are controlled by connection establishment information denoting the connection establishment state of the point-to-point connection, thereby allowing first DTV 12 to receive and see the output content of DVCR 10.

When a connection is established between DVCR 10 and first DTV as described above, if second DTV 14 is to monitor the output content of DVCR 10, which is a sink device, second DTV 14 attempts to establish a point-to-point connection or broadcast-in connection with DVCR 10 by overlaying the connection on the already established point-to-point connection between DVCR 10 and first DTV 12. In the case where a point-to-point connection is overlaid and established between second DTV 14 and DVCR 10, the content of oPCR of DVCR 10 is oPCR.P-2-P_Connection_Counter(P-2-Pcnt)=2, oPCR.Channel_Number (nCh)=33. The content of iPCR of second DTV 12 is iPCR.P-2-P_Connection_Counter(P-2-Pcnt)=1, iPCR. Channel_Number (nCh)=33. Similarly, second DTV 14 controls its own IEEE 1394 module according to such information, which allows it to receive and see the output content of DVCR 10.

According to the IEC 61883 format, when a point-to-point connection is made, only a device which establishes the connection can release the connection. Thus, a point-to-point connection between DVCR 10 and first DTV 12 can be released by first DTV 12. If first DTV 12 releases the connection to DVCR 10, the content of oPCR of DVCR 10 is oPCR.P-2-P_Connection_Counter(P-2-Pcnt)=0, oPCR. Channel_Number (nCh)=33. The content of iPCR of first DTV 12 is iPCR.P-2-P_Connection_Counter(P-2-Pcnt)=0, iPCR. Channel_Number (nCh)=33.

If a device other than first DTV 12 attempts to break the connection between DVCR 10 and first DTV 12, the concerned devices do not allow such an attempt to be made because the attempt does not comply with the relevant format. Similarly, if a device other than second DTV 12 attempts to break the connection between DVCR 10 and second DTV 12, the concerned devices do not permit such attempt because the formats do not conform. These particulars are specified in IEC 61883, and all devices that desire to transmit audio-video contents as an isochronous bit stream must follow this format.

In the same context, according to a method for managing a digital interface connection according to the conventional art, for example, if a third party device establishes a point-to-point connection between first and second devices, the connection cannot be released by any device other than the third party device. In the above example, if first DTV 12, which is the concerned connected device, attempts to connect an input plug used in the connection to another device, because the input plug is already point-to-point connected to DVCR 10, first DTV 12 cannot break the connection so long as second DTV 14 does not do so. Eventually, first DTV 12 encounters a problem because a considerable part of its operation depends on the operation of second DTV 14. Furthermore, if second DTV 14 does not operate as desired by first DTV 12, second DTV 14 cannot perform its own desired operation.

For instance, it is assumed that when digital-video home system (D-VHS), DTV, and digital versatile disk (DVD) are connected to an IEEE 1394 network, a user converts D-VHS to a reproducing mode, and thus D-VHS establishes a point-to-point connection with DTV which is its own default display device. Furthermore, it is assumed that the user desires to view DVD in the middle of viewing D-VHS to select DVD as a source on the DTV screen by operating source select screen of the DTV. In this case, despite the fact that the user intends to break away from D-VHS content and to view the DVD content instead, the DTV cannot actually carry out such operation.

In order to perform the operation, the DTV must break a point-to point connection between its own input plug and D-VHS's output plug to thereafter establish a new connection between its own input plug and DVD's output plug. However, because the point-to-point connection is established by the D-VHS, the DTV has no authority to break the connection. Thus, the user's request to view DVD on the DTV screen is not satisfied. Therefore, a method for managing a digital interface connection according to the conventional art is inconvenient because the concerned connected device cannot break the connection.

SUMMARY OF THE INVENTION

To solve the above problem, it is an object of the present invention to provide a method for managing a digital interface connection which, when a point-to-point connection is established among digital devices interconnected through a digital interface, such as an IEEE 1394, the concerned device of the point-to-point connection can break the connection.

To achieve the above object, the present invention provides a method for managing the connection of a plurality of devices which are point-to-point connected by a digital interface through the digital interface, the method including: (a) where an arbitrary first device has to break a point-to-point connection between the first device and another device which are point-to-point connected to the first device, the first device sending a second device, which established the point-to-point connection, a connection release request command requesting the second device to break the connection; (b) the second device receiving the connection release request command to analyze the connection release request command; and (c) the second device breaking the point-to-point connection in response to the connection release request command. In the method, the second device is another device which is point-to-point connected to the first device.

Furthermore, the method preferably includes, prior to (c): (p-c-1) the second device determining whether a point-to-point connection previously established by the second device exists based on the result of the analysis made in (b); and (p-c-2) if a point-to-point connection previously established by the second device exists, the second device determining whether to break the point-to-point connection. (c) includes: (c-1) if the second device is determined to break the connection in (p-c-2), the second device breaking the point-to-point connection established between the first device and another device; and (c-2) if the second device is not determined to break the connection in (p-c-2), the second device maintaining the point-to-point connection established between the first device and another device. In this case, in (p-c-2), a user decides whether he or she will break the connection.

In addition, prior to (p-c-2), the method preferably includes: (p-c-1-a1) if the previously established point-to-point connection is determined to exist in (p-c-1), the second device indicating whether to break the connection on a display device; and (p-c-2) includes the user determining whether the connection is to be released, on the basis of the indication on whether the connection is released in (p-c-1-a1). In this case, the connection release request command includes a plug type field which indicates the plug type of the first device in the presently established point-to-point connection, and a plug identification field which indicates the plug identifier of the first device as an operand. Furthermore, the connection release request command is an audio-video control command defined within an audio-video control command transaction set, and the digital interface conforms to the IEEE 1394 standard.

BRIEF DESCRIPTION OF THE DRAWINGS

The above object and advantage of the present invention will become more apparent by describing in detail preferred embodiments thereof with reference to the attached drawings in which.

DETAILED DESCRIPTION OF THE INVENTION

Figure 1:
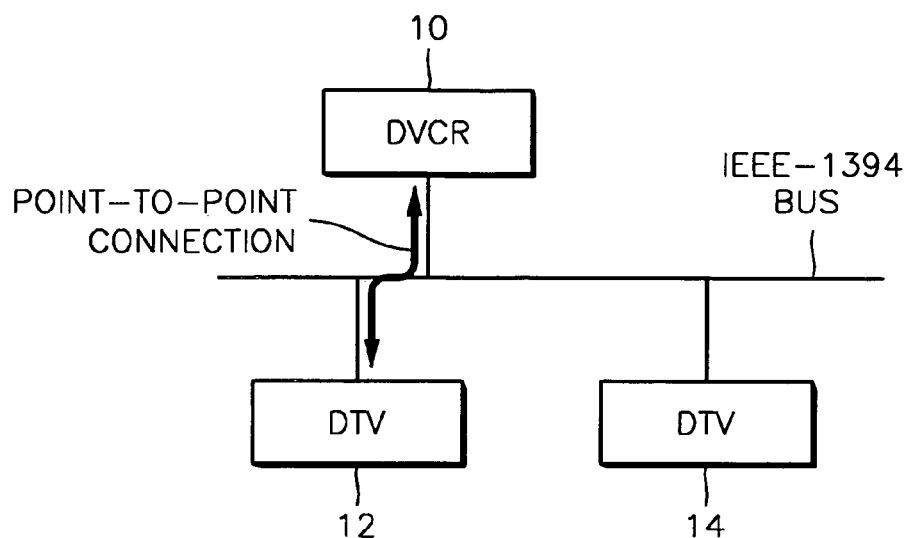
FIG. 1 is a diagram for explaining a conventional connection management method.
Figure 2:
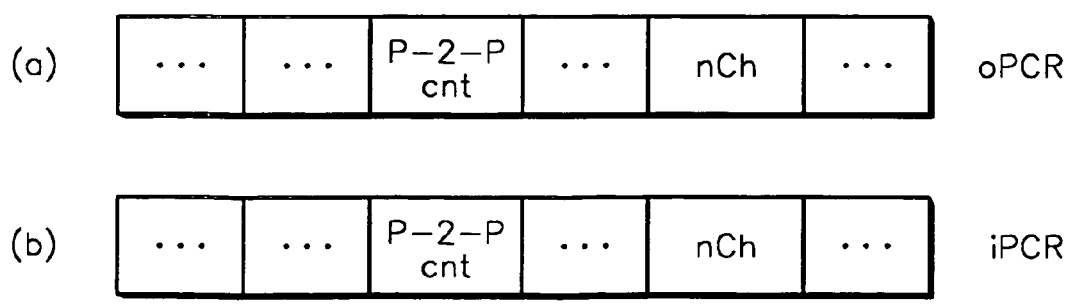
FIG. 2 is a diagram showing the connection related fields of an output plug control register (OPCR) and an input plug control register (iPCR) used in the standard of International Electrotechnical Commission (IEC) 61883.
Figure 3:
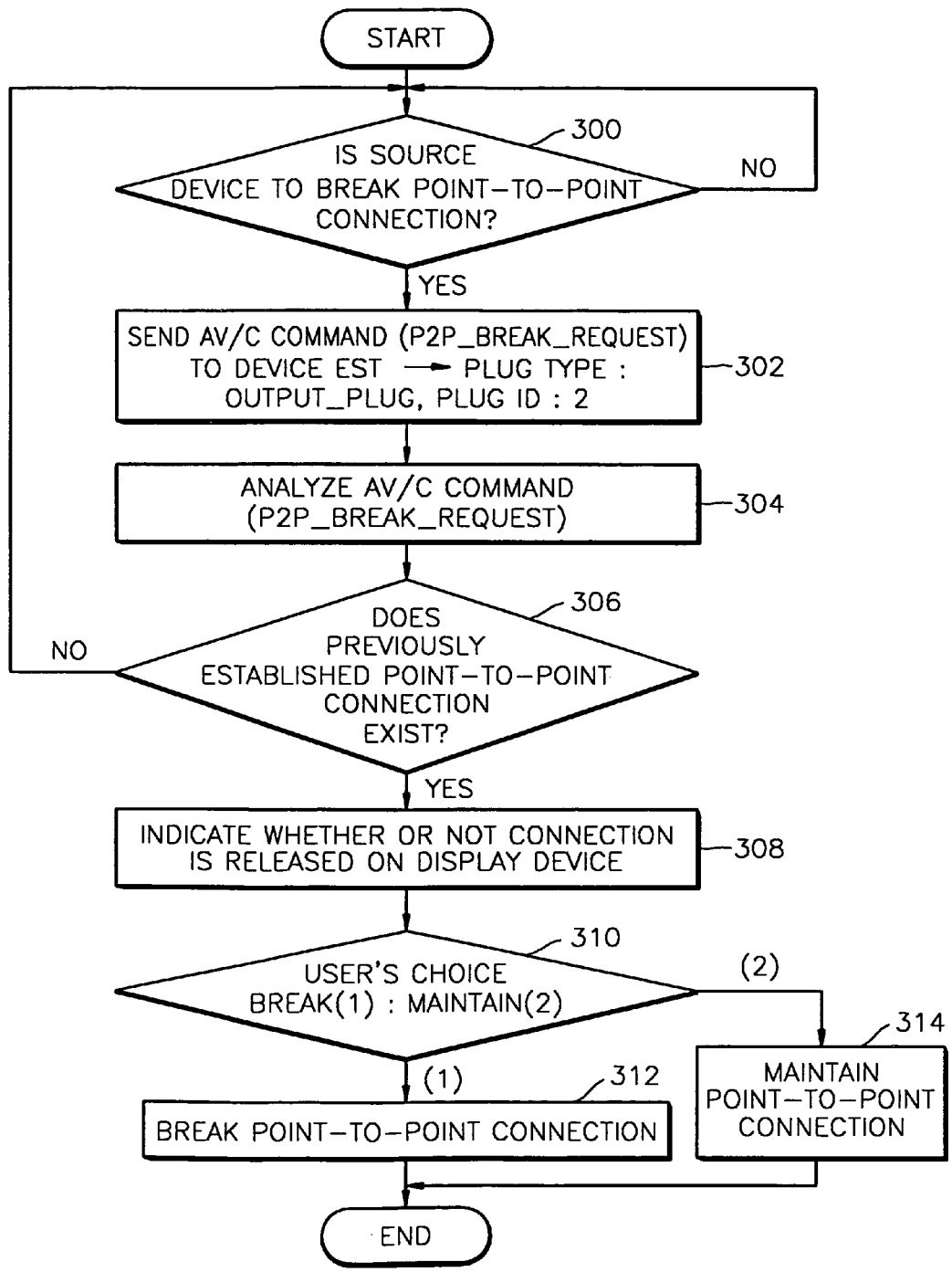
FIG. 3 is a flowchart showing a method for managing a digital interface connection according to an embodiment of the prevent invention.
Figure 4:
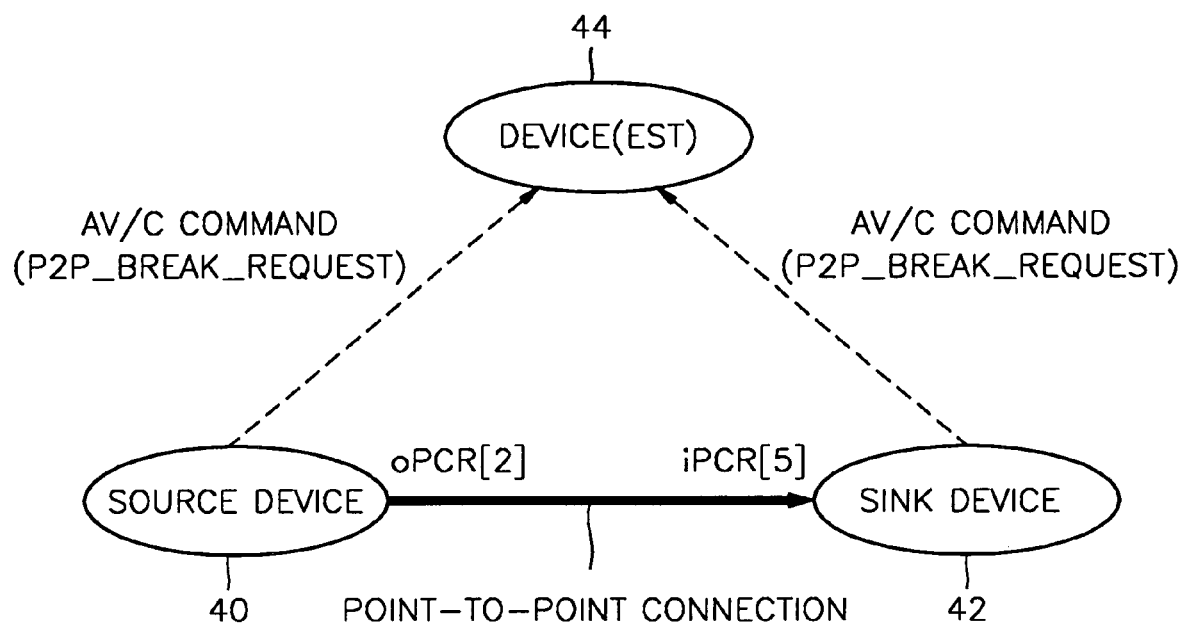
FIG. 4 is a diagram for explaining a connection managing operation according to the method of FIG. 3.

Referring to FIGS. 3 and 4, it is assumed that a point-to-point connection is made between a source device 40 and a sink device 42 through an output plug No. ID 2 of source device 40 and an input plug ID No. 5 of sink device 42. The point-to-point connection is established by a device EST 44. If a user determines that a source device 40 desires to break the point-to-point connection (step 300), source device 40 sends device EST 44, which establishes the point-to-point connection, a command P2P_Break_Request requesting another device to break a point-to-point connection to which source device 40 is currently connected (step 302). In an embodiment of the present invention, the command P2P_Break_Request uses an audio-video control (AV/C) command defined in an AV/C command transaction set (AV/C CTS). Furthermore, the AV/C command includes a plug type field indicating whether the plug is an output or input plug, and a plug identification (ID) denoting a plug identifier as an operand.

According to the embodiment, the plug type field is established in such a way as to indicate an output plug OUTPUT_PLUG corresponding to the plug type of source device 40 in the currently established point-to-point connection. The plug ID field is established in such a way as to indicate 2, corresponding to the plug identifier of source device 40 in the currently established point-to-point connection.

As described above, if the source device is to break the connection, source device 40 requests device EST 44 to release the point-to-point connection, using the command P2P_Break_Request which demands a break in the point-to-point connection to which source device 40 is currently related. In other words, source device 40 establishes the operands of the command as PlugType=OUTPUT_PLUG and Plug ID=2 to forward the command P2P_Break_Request (OUTPUT_PLUG, 2) to device EST 44.

Next, device EST 44 analyzes the AV/C command P2P_Break_Request (step 304). Then, device EST 44 determines whether or not the point-to-point connection is a point-to-point connection previously established by itself based on the result of the analysis made in step 304 (step 306). If it is determined that the point-to-point connection is a point-to-point connection previously established by itself in step 306, device EST 44 indicates whether to break the connection or not, in a display device such as an on screen display (OSD) (step 308). The user determines whether he or she will break the connection according to the indication on the display device (step 310).

If the user chooses to break the connection ((1)), device EST 44, which established the point-to-point connection, breaks the point-to-point connection established between source device 40 and sink device 42 (step 312). On the other hand, if the user does not choose to break the connection ((2)), device EST 44 maintains the point-to-point connection between source device 40 and sink device 42 (step 314).

In another case, if sink device 42 is to break the point-to-point connection, then sink device 42 requests device EST 44 to release the point-to-point connection, using the command P2P_Break_Request which is supposed to demand a break in the point-to-point connection to which source device 40 is currently related. In other words, source device 40 establishes the operands of the command as PlugType=INPUT_PLUG and Plug ID=5 to forward the command P2P_Break_Request (INPUT_PLUG, 5) to the device EST 44. When the command P2P_Break_Request is received from an external device, the device EST analyzes the plug type and plug ID to determine whether or not the point-to-point connection is a point-to-point connection previously established by itself. If it is determined that the point-to-point connection is a point-to-point connection previously established by itself, device EST 44 indicates whether or not to break the connection, and the user determines whether he or she will break the connection depending on the indication on the display device.

If the user chooses to break the connection, device EST 44, which previously established the point-to-point connection, breaks the point-to-point connection established between source device 40 and sink device 42 (step 312). On the other hand, if the user does not choose to break the connection ((2)), device EST 44 maintains the point-to-point connection between source device 40 and sink device 42 (step 314).

Therefore, according to the connection managing method of the digital interface described above, if a plurality of devices are connected through a point-to-point connection, the concerned device of the point-to-point connection can break the connection. Accordingly, because a point-to-point connection can be released at the request of a device other than the device which establishes the connection, the efficiency of the connection management can be enhanced.

Meanwhile, the above method may be embodied as a computer program which can be executed on a computer including a microprocessor or processor. Further, the program can be stored in a recording medium such as a magnetic recording medium or an optical recording medium. Preferably, the program can be held in a memory such as read-only memory (ROM) or flash memory. In addition, the program can be scattered within the devices connected by a digital interface to be stored and executed thereon.

A flash memory, in which a program for implementing the above method is stored, and a microprocessor, which reads out the program from the flash memory to execute it, constitute firmware for performing a control operation on devices connected to a digital interface. Further, the control operation performed by firmware acts as software such as a protocol performed between devices linking through a digital interface, as understood by one skilled in the art.

Further, although the embodiments are described with reference to the use of a command defined in AV/C CTS as a specific command, it is exemplary only, and it is possible to use a command defined in other kinds of control protocols such as home wide web (HWW), home audio/video interoperability (HAVi), computer-assisted learning (CAL), and EHS. In other words, the present invention is not restricted to the embodiments, nor do the embodiments limit the scope of the invention as defined by the claims.

As described in the foregoing, when a plurality of devices are point-to-point connected by a digital interface, a method for managing a digital interface connection according to the present invention enables the concerned device of the point-to-point connection to break the connection, thereby allowing for enhanced connection management efficiency.

What is claimed is:

1. A method for managing the connection of a plurality of devices which are point-to-point connected by a digital interface, the method comprising:
   (a) a second device, which establishes a point-to-point connection between an arbitrary first device and another device, receiving a connection release request command requesting the second device to break the point-to-point connection from the first device;
   (b) the second device breaking the point-to-point connection in response to the connection release request command,
   wherein the point-to-point connection is defined by an output plug of the first device, an input plug of the another device and a channel between the output plug and the input plug, and
   wherein the connection release request command includes a plug type field which indicates a plug type of the first device in the point-to-point connection, and a plug identification field which indicates the plug identifier of the first device as operands.

2. The method of claim 1,
   wherein the connection release request command is an audio-video control command defined within an audio-video control command transaction set.

3. The method of claim 1, wherein said first device sends said connection release request command to said second device.

4. The method of claim 1, wherein said another device sends said connection release request command to said second device.

5. The method of claim 1, wherein the output plug and the input plug are defined according to the IEC 61883 standard.

6. The method of claim 1,
   wherein the digital interface conforms to the IEEE 1394 standard.

7. A method for managing the connection of a plurality of devices which are point-to-point connected by a digital interface, the method comprising:
   (a) a second device, which establishes a point-to-point connection between an arbitrary first device and another device, receiving a connection release request command requesting the second device to break the point-to-point connection from the first device;
   (b) the second device breaking the point-to-point connection in response to the connection release request command,
   wherein prior to (b), the second device analyzing the connection release request command to determine whether the point-to-point connection was previously established by itself, and
   wherein (b) comprises (b') if it is determined that the point-to-point connection is a point-to-point connection previously established by the second device, the second device breaking the point-to-point connection.

8. The method of claim 7, wherein (b') comprises:

(b'-1) if it is determined that the point-to-point connection is a point-to-point connection previously established by the second device, a user determining whether to break the point-to-point connection by the second device;

(b'-2) if the user determines to break the connection in (b'-1), the second device breaking the point-to-point connection established between the first device and another device; and (b'-3) if the user determines not to break the connection in (b'-1), the second device maintaining the point-to-point connection established between the first device and another device.

9. The method of claim 8, wherein (b'-1) comprises:

(b'-1-1) if the point-to-point connection is determined to be a point-to-point connection previously established by the second device, the second device indicating whether to break the point-to-point connection on a predetermined display device; and (b'-1-2) the second device receiving a determination on whether to break the point-to-point connection by the second device from the user.

10. A method for managing the connection of a plurality of devices which are point-to-point connected by a digital interface, the method comprising:

(a) a second device, which establishes a point-to-point connection between an arbitrary first device and another device, receiving a connection release request command requesting the second device to break the point-to-point connection from the first device;

(b) the second device breaking the point-to-point connection in response to the connection release request command, wherein the connection release request command includes a plug type field which indicates the plug type of the first device in the presently established point-to-point connection, and a plug identification field which indicates the plug identifier of the first device as an operand.

11. The method as in any one of claims 2–7, wherein the digital interface conforms to the IEEE 1394 standard.

* * * * *